(12) United States Patent  
Yoshizawa

(10) Patent No.: US 7,950,367 B2
(45) Date of Patent: May 31, 2011

(54) ACCELERATOR POSITION SENSOR ARRANGEMENT STRUCTURE FOR MOTORCYCLE

(75) Inventor: Tomoya Yoshizawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/056,108

(22) Filed: Mar. 26, 2008

(65) Prior Publication Data

US 2008/0236543 A1 Oct. 2, 2008

(30) Foreign Application Priority Data

Mar. 30, 2007 (JP) .................................. 2007-090619
Dec. 27, 2007 (JP) .................................. 2007-335752

(51) Int. Cl.
*F02D 11/10* (2006.01)
(52) U.S. Cl. ........................................ 123/399; 123/376
(58) Field of Classification Search .................. 123/399, 123/376

See application file for complete search history.

(56) References Cited

U.S. PATENT DOCUMENTS

| 6,543,523 B2* | 4/2003 | Hasumi ........................ 165/125 |
| 6,619,415 B1* | 9/2003 | Hasumi et al. ................ 180/68.1 |
| 6,889,654 B2* | 5/2005 | Ito ................................. 123/396 |
| 2006/0065455 A1* | 3/2006 | Saiki et al. ................... 180/68.4 |

FOREIGN PATENT DOCUMENTS

JP 2001-246960 A 9/2001

* cited by examiner

Primary Examiner — Stephen K Cronin
Assistant Examiner — Anthony L Bacon
(74) Attorney, Agent, or Firm — Birch Stewart Kolasch & Birch, LLP

(57) ABSTRACT

To provide an accelerator position sensor arrangement structure for a motorcycle that can prevent an increased vehicle-width without change of operational feeling of a throttle. An accelerator position sensor is connected to a throttle grip via a pair of throttle cables and disposed externally of main frames, of a body frame, extending from a head pipe toward the rearward of a vehicle body.

20 Claims, 16 Drawing Sheets

ACCELERATOR POSITION SENSOR ARRANGEMENT STRUCTURE FOR MOTORCYCLE

CROSS-REFERENCE TO RELATED APPLICATIONS

This nonprovisional application claims priority under 35 U.S.C. §119(a) on Patent Application Nos. 2007-090619 and 2007-335752, filed in Japan on Mar. 30, 2007 and Dec. 27, 2007, respectively. The entirety of each of the above-identified applications is incorporated herein by reference.

BACKGROUND OF THE INVENTION

1. Field of the Invention

The present invention relates to an accelerator position sensor arrangement structure for a motorcycle, wherein the operation of a throttle grip is detected by an accelerator position sensor and a throttle valve is driven by a control motor to control an amount of intake air for an engine.

2. Background of the Invention

Examples of vehicles; namely, motorcycles include one in which a throttle grip and a throttle valve which controls an amount of intake air for an engine are connected through a throttle wire and the throttle valve is manually operated in response to throttle operation. In recent years, there has been a vehicle in which the operation of a throttle grip is detected by an accelerator position sensor and a throttle valve is driven by a control motor. In a motorcycle of this type, wherein the throttle valve is driven by the motor, an accelerator position sensor is disposed at one shaft end of the throttle valve in a throttle body connected to an engine. Therefore, the accelerator position sensor is disposed by the side of the throttle body (see Japanese Patent Laid-open No. 2001-246960, for example).

In the configuration according to the background art, wherein the throttle valve is driven by the motor, the throttle wire is connected to a position approximately equal to that of the vehicle with the throttle valve that is manually operated. Therefore, the throttle wire can be extended in the same way, which offers approximately the same operational feeling of the throttle.

However, the accelerator position sensor is disposed by the side of the throttle body. Therefore, a space is needed to dispose the sensor by the side of the throttle body. If the throttle body is disposed between a pair of left and right main frames of a body frame, it is needed to expand the gap between the main frames, which causes a problem of increased vehicle-width.

SUMMARY OF THE INVENTION

The present invention has been made in view of the foregoing and provides an accelerator position sensor arrangement structure for a motorcycle that can prevent an increased vehicle-width.

To solve the above problem, the present invention is directed to an accelerator position sensor arrangement structure for a motorcycle, wherein an accelerator position sensor detects operation of a throttle grip and a control motor drives a throttle valve that controls an amount of intake air for an engine supported by a body frame, the accelerator position sensor is connected to the throttle grip via a throttle cable, and is disposed externally of main frames, of the body frame, extending from a head pipe toward the rearward of a vehicle body.

According to the present invention, the accelerator position sensor is connected to the throttle grip via the throttle cable and is disposed externally of the main frames, of the body frame, extending from the head pipe toward the rearward of the vehicle body. Thus, the accelerator position sensor can easily be disposed compared with the arrangement of the accelerator position sensor between the main frames and it is possible to suppress an increase in vehicle-width without changing the operating feeling of the throttle.

In this case, preferably, the main frames branch right and left from the head pipe and extend toward the rearward of the vehicle body and the accelerator position sensor is disposed externally of a vehicle body left side main frame. With this configuration, the throttle cable can be extended to draw a gentle arc without an abrupt bend.

In this case, preferably, the throttle grip is provided on the right side of a handlebar and the throttle cable extending from the throttle grip is arranged to extend from the vicinity of the head pipe along the an external lateral surface of the vehicle body left side main frame and is connected to the accelerator position sensor. With this configuration, the extending arrangement of the throttle cable is made to have approximately the same trajectory as in the configuration according to the background art, wherein the throttle cable extending from the throttle grip is directly connected to the throttle valve and is made approximately the same extending length as that of the one according to the background art. This can make the operating feeling of the throttle approximately the same as that of the one according to the background art.

In this case, preferably, the motorcycle includes a transverse-mounted radiator disposed externally of the vehicle body left side main frame, and a side cover covering a vehicle body lateral portion including the radiator, the side cover has an appearance cover covering the radiator from above so as to be exposed to the outside, and the accelerator position sensor is disposed between the appearance cover and the radiator. With this configuration, the space defined between the transverse-mounted radiator and the appearance cover can effectively be used to dispose the accelerator position sensor and also adhesion of dust or the like can be avoided.

The present invention is also directed to an accelerator position sensor arrangement structure for a motorcycle, wherein an accelerator position sensor detects operation of a throttle grip and a control motor drives a throttle valve that controls an amount of intake air for an engine supported by a body frame, the body frame includes a pair of right and left main frames which extend rearward of the vehicle body from a head pipe; a pair of left and right down tubes that extend from the head pipe downwardly of a vehicle body and support an engine; and a connection member that connects a rear portion of the main frame with a lower portion of the down tube; and an opening is provided which is surrounded by the main frame, the down tube and the connection member so as to open to a side of the vehicle body and the accelerator position sensor connected to the throttle grip via a throttle cable is disposed in the opening.

According to the present invention, since the opening is provided that is surrounded by the main frame, the down tube and the connection member so as to open to a side of the vehicle body, and the accelerator position sensor connected to the throttle grip via a throttle cable is disposed in the opening, it is possible to suppress an increase in vehicle-width without changing an operation feeling of a throttle as compared with a configuration in which the accelerator position sensor is disposed between the main frames.

In this case, preferably, the main frames, the down tubes and the connection members are integrally formed by casting.

With this configuration, compared with the case where they are manufactured separately from each other, an operation for joining them is eliminated and variations in the shapes of the openings adapted to receive an accelerator position sensor disposed therein are reduced.

In this case, preferably, a transverse-mounted radiator disposed on the outside of the main frames is disposed at a position overlapping the accelerator position sensor as viewed from the side. With this configuration, the accelerator position sensor can inconspicuously be disposed in terms of external appearance.

In the present invention, the accelerator position sensor is connected to the throttle grip via the throttle cable, and is disposed externally of the main frames, of the body frame, extending from the head pipe toward the rearward of the vehicle body. Therefore, the accelerator position sensor can easily be arranged and an increase in vehicle width can be suppressed without changing the operating feeling of the throttle.

The main frames branch right and left from the head pipe and extend toward the rear of the vehicle body, and the accelerator position sensor is disposed externally of a vehicle body left side main frame. Therefore, the throttle cable can be extended to draw a gentle arc without an abrupt bend.

The throttle grip is provided on the right side of the handlebar, and the throttle cable extending from the throttle grip is arranged to extend from the vicinity of the head pipe along the external lateral surface of the vehicle body left side main frame and is connected to the accelerator position sensor. Therefore, the operating feeling of the throttle can be made approximately the same as that of the one according to the background art.

The motorcycle includes the transverse-mounted radiator disposed externally of the vehicle body left side main frame and the cover covering a vehicle body lateral portion including the radiator, the side cover has an appearance cover covering the radiator from above so as to be exposed to the outside, and the accelerator position sensor is disposed between the appearance cover and the radiator. Therefore, the space defined between the transverse-mounted radiator and the appearance cover can effectively be used to dispose the accelerator position sensor and also adhesion of dust or the like can be avoided.

In the present invention, the opening is provided that is surrounded by the main frame, the down tube and the connection member so as to open to a side of the vehicle body, and the accelerator position sensor connected to the throttle grip via the throttle cable is disposed in the opening. Therefore, it is possible to suppress an increase in vehicle-width without changing feeling operation of a throttle.

Since the main frames, the down tubes and the connection members are integrally formed by casting, an operation for joining them is eliminated and variations in the shapes of the opening portions adapted to receive the accelerator position sensor disposed therein are reduced.

The transverse-mounted radiator disposed on the outside of the main frames is disposed at a position overlapping the accelerator position sensor as viewed from the side. Therefore, exposing the accelerator position sensor to the outside can be avoided and the arrangement flexibility of the transverse-mounted radiator can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
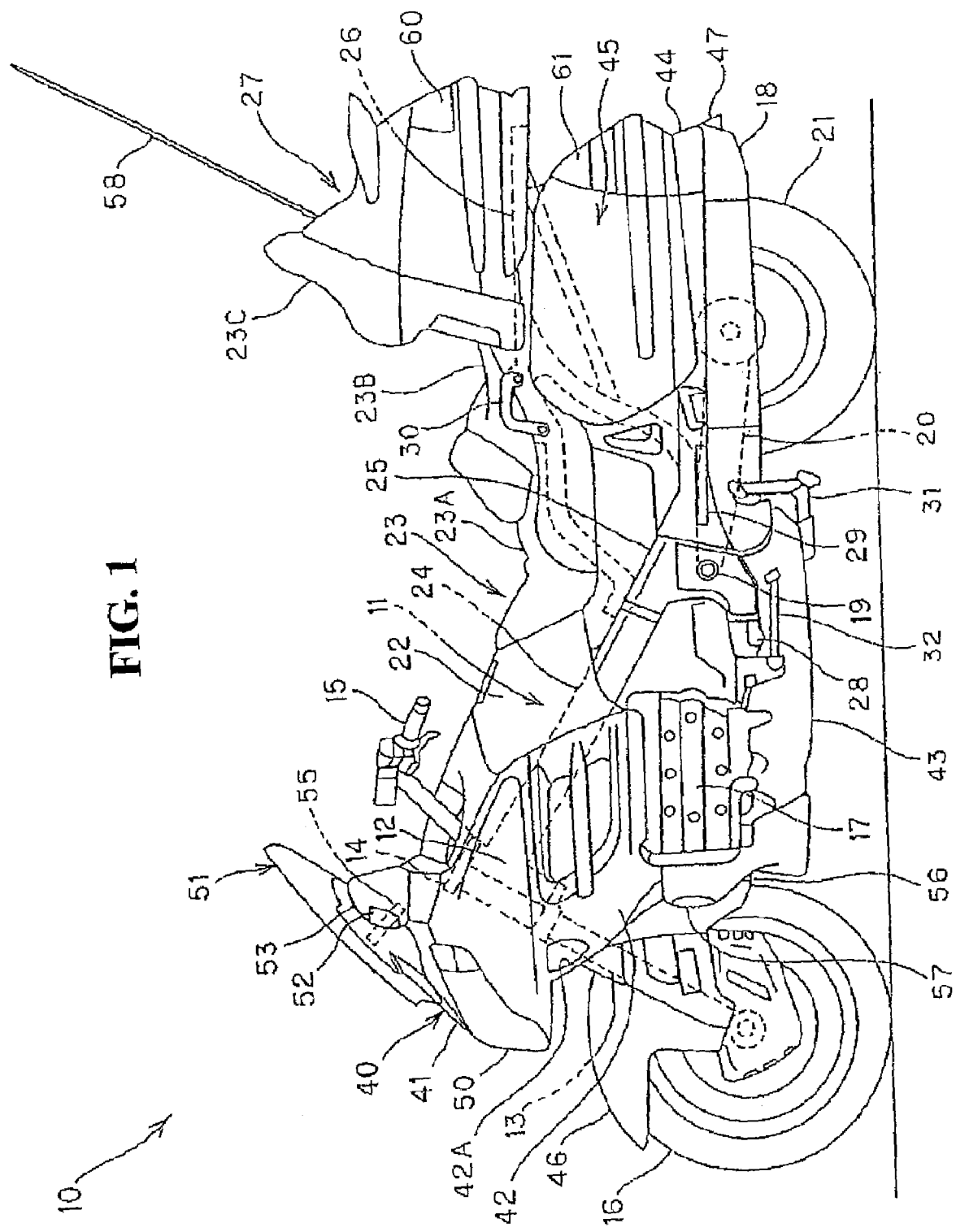
FIG. 1 is a lateral view of a motorcycle according to an embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

An embodiment of the present invention will hereinafter be described with reference to the accompanying drawings. It is to be noted that the directions such as the front, the rear or back, the left, the right, the upside, the lower side and the like are described with respect to a vehicle body.

First Embodiment

Figure 2:
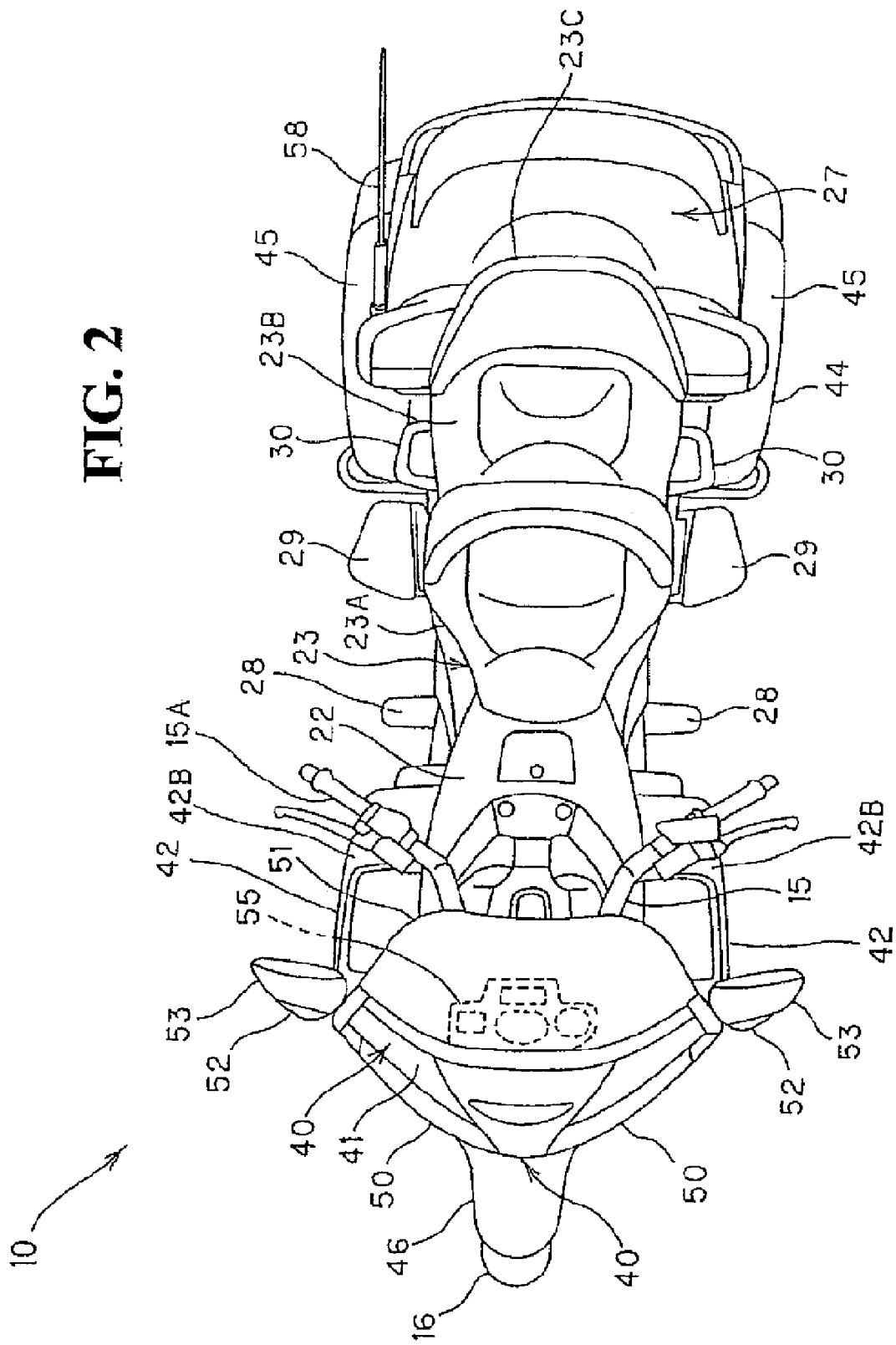
FIG. 2 is a plan view of the motorcycle.
Figure 3:
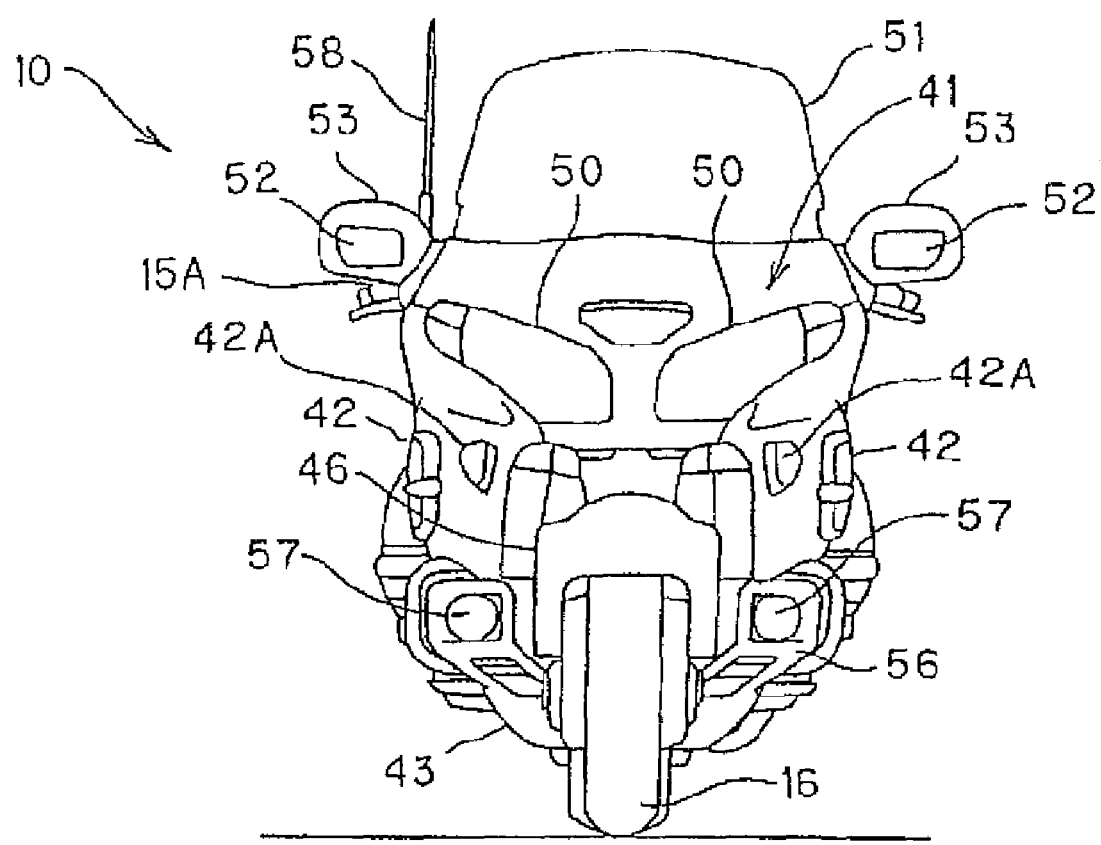
FIG. 3 is a front view of the motorcycle.
Figure 4:
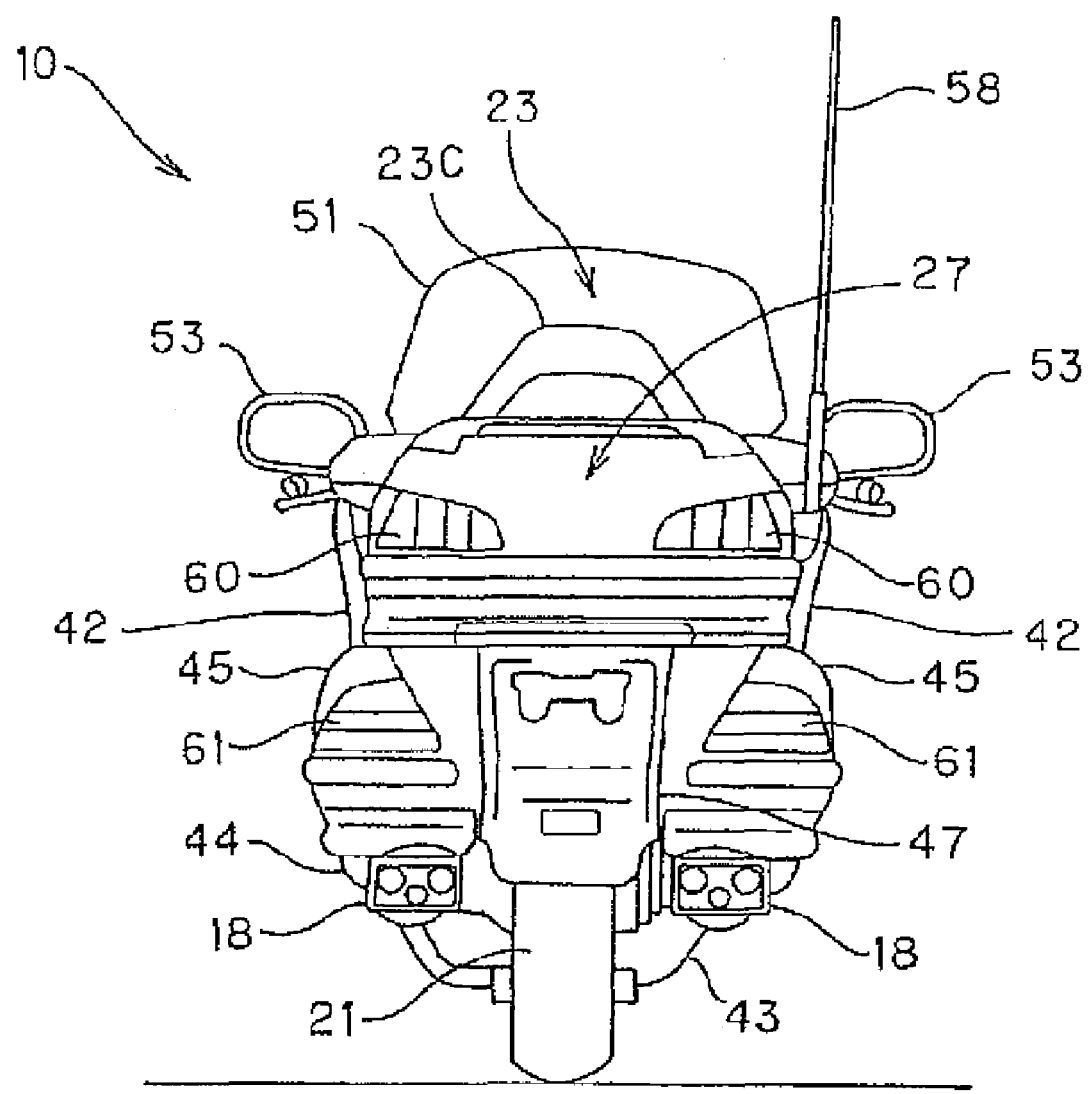
FIG. 4 is a rear view of the motorcycle.

FIG. 1 is a lateral view of a motorcycle according to an embodiment of the present invention. FIG. 2 is a plan view of the motorcycle. FIG. 3 is a front view of the motorcycle. FIG. 4 is a rear view of the motorcycle.

Referring to FIGS. 1 and 2, the motorcycle 10 includes a body frame 11. A pair of left and right front forks 13 are turnably supported by a head pipe 12 attached to the front end of the body frame 11. A steering handlebar 15 is attached to a top bridge 14 supporting the upper end of the front fork 13. A front wheel 16 is rotatably supported by the front fork 13. The motorcycle 10 further includes an engine 17 supported by the body frame 11. An exhaust muffler 18 is connected to the engine 17 via an exhaust pipe (not shown). A rear fork 20 is swingably supported up and down by a pivot 19 located at the rear-lower portion of the body frame 11. A rear wheel 21 is rotatably supported by the rear end of the rear fork 20. Rear cushions (not shown) are disposed between the rear fork and the body frame 11.

The body frame 11 includes a pair of right and left main frames 24 that branch right and left from the head pipe 12 and extend rearward and obliquely downwardly. A pair of left and right pivot plates 25 are connected respectively to the rear portions of the main frames 24. A pair of left and right seat rails 26 extend rearward and obliquely upwardly from front and rear portions of the pivot plates 25. The engine 17 is supported below the main frames 24 and a fuel tank 22 is supported above the main frames 24. An occupant's seat 23 is mounted on the upper portion of the seat rails 26 and a grab rail 30 and a trunk box 27 are mounted to the rear portion of the seat rail 26.

The occupant's seat 23 includes a front seat 23A that extends rearward of the fuel tank 22 and on which a rider sits. A rear seat 23B is formed rearward of the front seat 23A to be raised and on which a pillion passenger sits. A pillion passenger's backrest 23C is supported on the rear seat 23B. The pivot plate 25 of the body frame 11 is attached with a pair of left and right steps (the rider's foot-placed steps 28 for a rider sitting on the front seat 23A), and with a pair of left and right steps (pillion passenger's foot-placed steps) 29 for the pillion passenger sitting on the rear seat 23B. The grab rail 30 to be grabbed by the pillion passenger, a main stand 31, a sub stand 32, a body cowling 40 described later, etc. are attached to the body frame 11.

The body cowling 40 includes a front fairing 41 covering the vehicle body from the front. A pair of left and right side covers 42 covers the lateral portions of the vehicle body. An under cover 43 covers the lower portion of the vehicle body. A rear seat cowl 44 covers the rear portion of the vehicle body. A front fender 46 is attached to the front fender 46 so as to cover the front wheel 16. A pair of left and right saddlebags 45 are formed integrally with the rear seat cowl 44. A rear fender 47 is attached to the seat cowl 44 so as to cover the rear wheel 21. The front fairing 41 and the pair of left and right side covers 42 may be formed integrally with each other.

Referring to FIG. 3, headlights 50 are provided on the front surface of the front fairing 41 and a windscreen (wind shield) 51 is attached above the headlights. Left and right mirrors 53 each incorporating a front blinker are respectively provided at the left and right ends of the front fairing 41. As shown in FIG. 2, vehicle meters 55 are disposed inside of the front fairing 41.

As shown in FIG. 3, the side covers 42 are respectively provided with a pair of left and right air openings 42A adapted to supply outside air from the front of the vehicle to the surrounding of the engine 17. An engine guard 56 is provided left-forward of and right-forward of the engine 17 and a pair of left and right fog lamp 57 are attached to the engine guard 56.

As shown in FIG. 2, a pair of left and right side upper covers (appearance covers) 42B are attached to the respective side covers 42 so as to cover between each of the side covers 42 and a corresponding one of the main frames 24 and to be exposed to the outside. The side upper covers 42B block flow of heat warmed by the engine 17 through the gaps each between the side cover 42 and the body frame 11. The side upper cover 42B also functions as a decorative cover that covers the radiator 67 (FIG. 5), described later, from above.

Referring to FIG. 4, a pair of left and right tail lamp units 60 is arranged on the rear surface of the trunk box 27 and rear blinkers 61 are respectively arranged on the rear surfaces of the saddle bags 45. A rod antenna 58 is attached to the right-hand portion of the trunk box 27 in order to be used when an audio unit (not shown) incorporated in the motorcycle 10 receives radio broadcasting.

Figure 5:
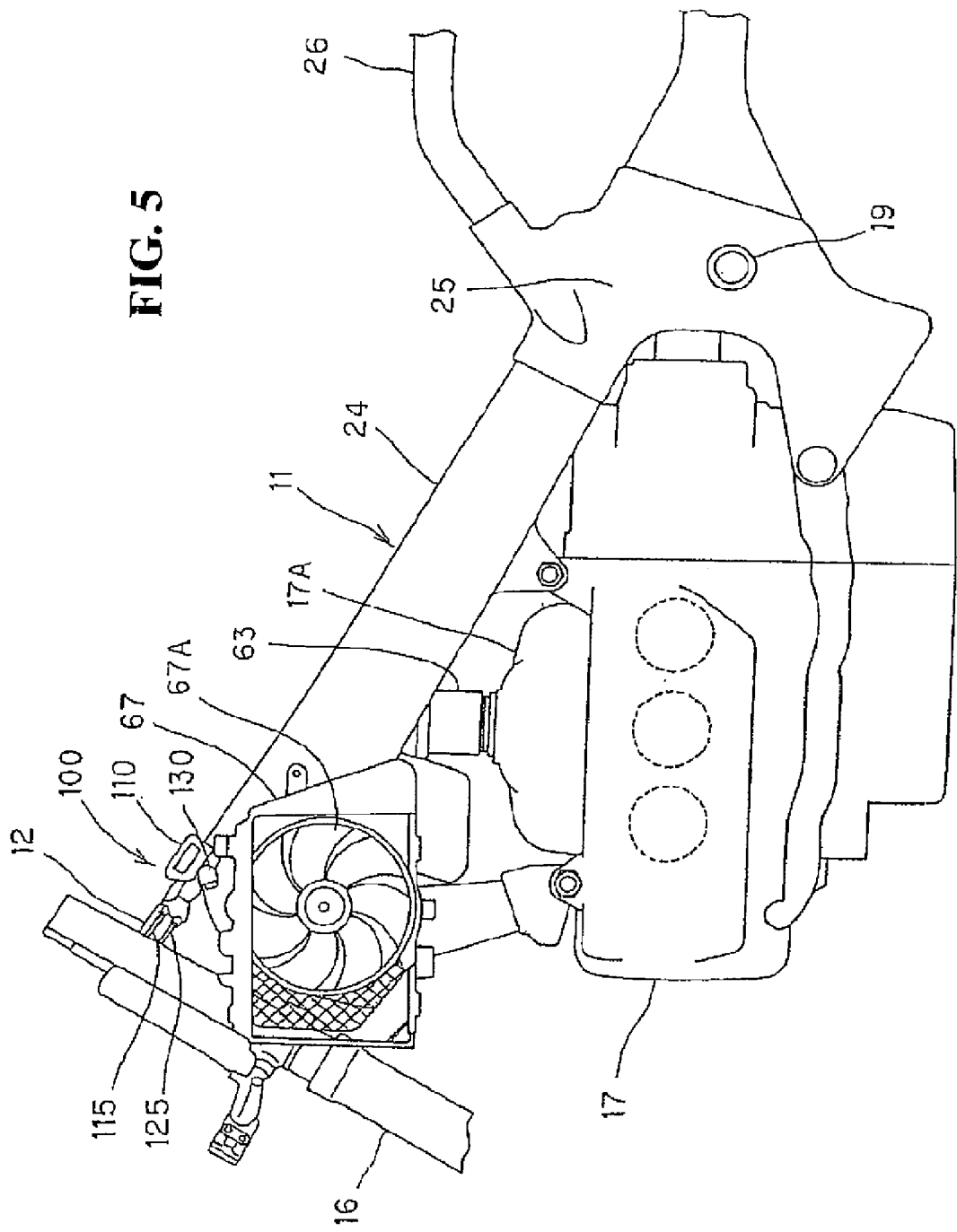
FIG. 5 is a lateral view illustrating an engine along with the peripheral configuration thereof.
Figure 6:
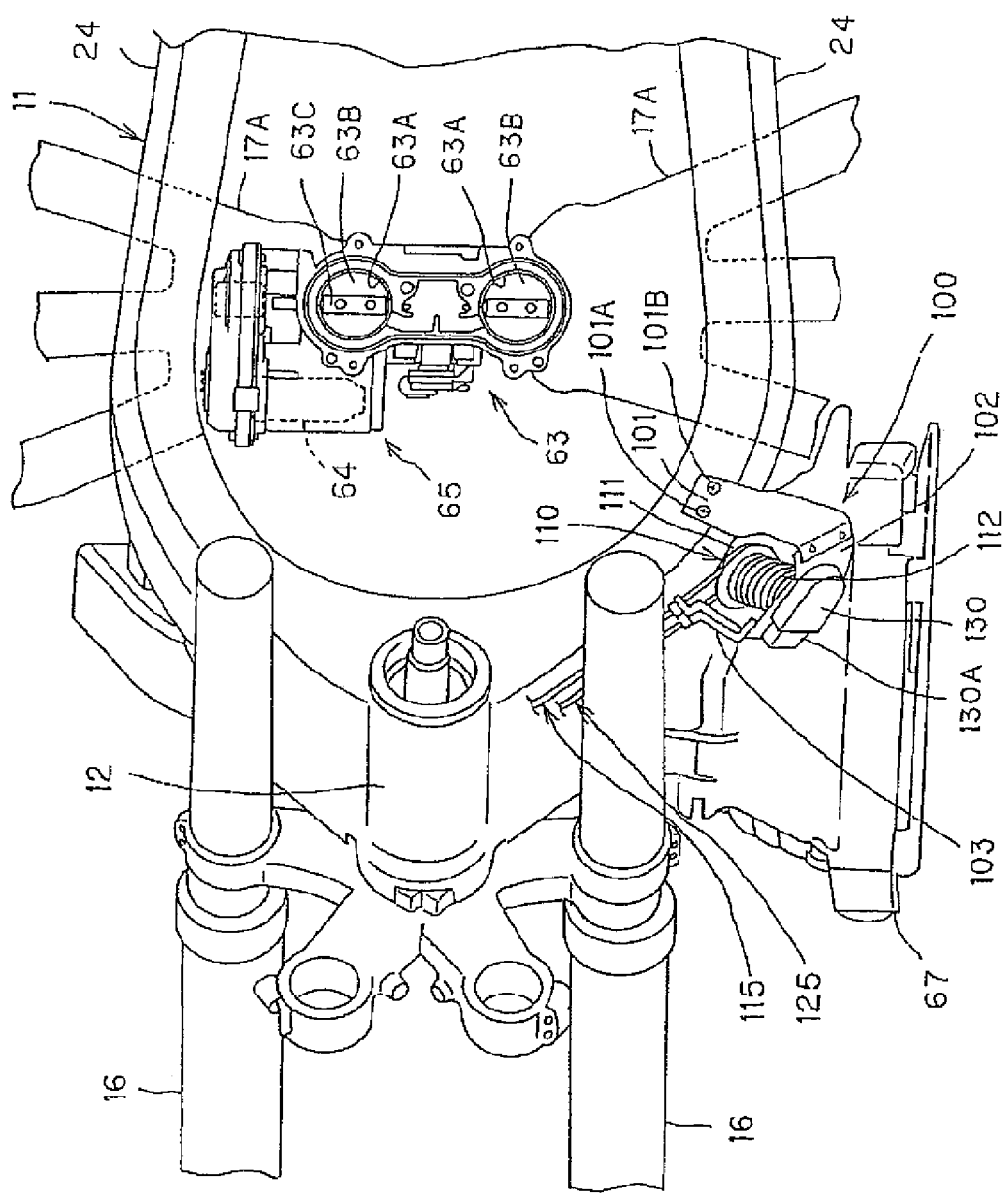
FIG. 6 is a plan view illustrating the engine along with the peripheral configuration thereof.

FIG. 5 illustrates both the engine 17 and its peripheral configuration and FIG. 6 is a plan view of FIG. 5. The engine 17 is a horizontally-opposed 6-cylinder engine in which three cylinders lined in the back and forth direction of the vehicle body are provided on each side, namely, on each of the left and right sides. Referring to FIG. 5, the engine 17 is carried by the main frames 24 and by the pivot plates 25. An intake manifold 17A is joined to the engine 17 from above and an air cleaner (not shown) is connected from above to the intake manifold 17A via a throttle body 63.

Referring to FIG. 6, the throttle body 63 has a pair of left and right intake passages 63A. Butterfly-type throttle valves 63B are supported by the respective intake passages 63A so as to have a common valve shaft 63C extending in the width-direction of the vehicle body and to control the respective opening degrees for controlling an amount of air intake for the engine 17.

An actuator 65 that receives therein a control motor 64 turnably driving the valve shaft 63C is disposed at one end (at the right-hand end of the vehicle body) of the valve shaft 63C. The actuator 65 and the throttle body 63 are disposed between the pair of left and right main frames 24. The actuator 65 supports the control motor 64 so that the rotational axis of the control motor 64 may be parallel to the valve shaft 63C. In addition, the actuator 65 constitutes an electric throttle mechanism which transmits the rotation of the control motor 64 to the valve shaft 63C via a reduction gear mechanism.

The engine 17 is a water-cooled engine and an radiator 67 is provided to cool the cooling water of the engine 17. As shown in FIG. 5, the radiator 67 is a transverse-mounted radiator transversely secured, from outside, to the front end of the left-hand main frame 24. A blast fan 67A is integrally attached to the radiator 67 so as to forcibly pass air through the radiator 67. An accelerator positioning sensor (hereinafter called the AP sensor) is disposed on the left-hand main frame 24 at a position above the radiator 67 so as to detect the operation of a throttle grip 15A (see FIG. 2) provided on the right side of the handlebar 15.

The AP sensor 100 will hereinafter be described with reference to FIGS. 7 to 9. The AP sensor 100 is disposed outside the vehicle body left side main frame 24 and above the radiator 67 via a bracket 101 which is secured at one end to the main frame 24 with screws 101A and 101B. Consequently, in the state where the body cowling 40 is attached, the AP sensor 100 is received in the space between the radiator 67 and the side upper cover 42B (FIG. 2) covering between the side cover 42 and the main frame 24.

Figure 7:
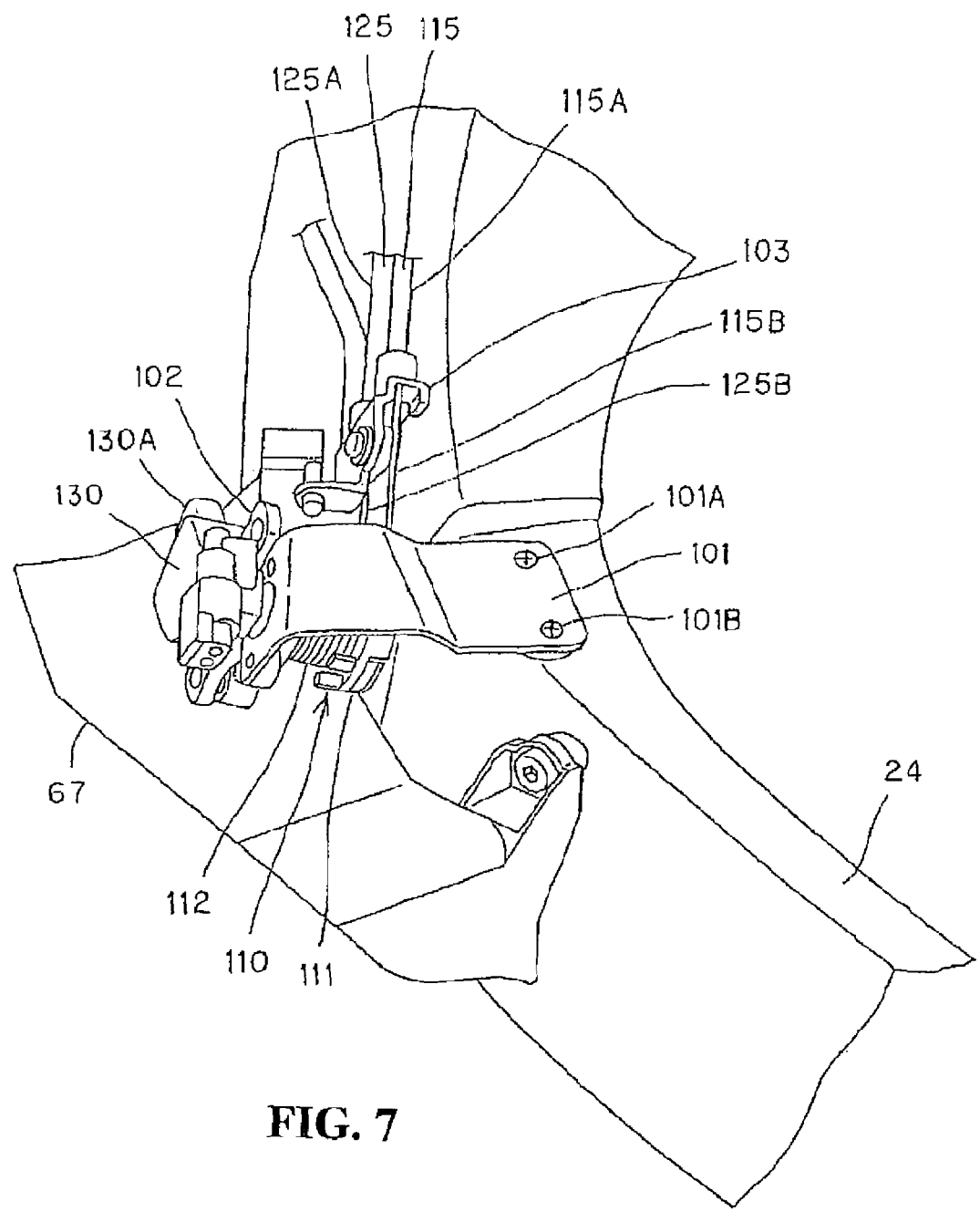
FIG. 7 is a perspective view illustrating an AP sensor along with the peripheral configuration thereof.
Figure 8:
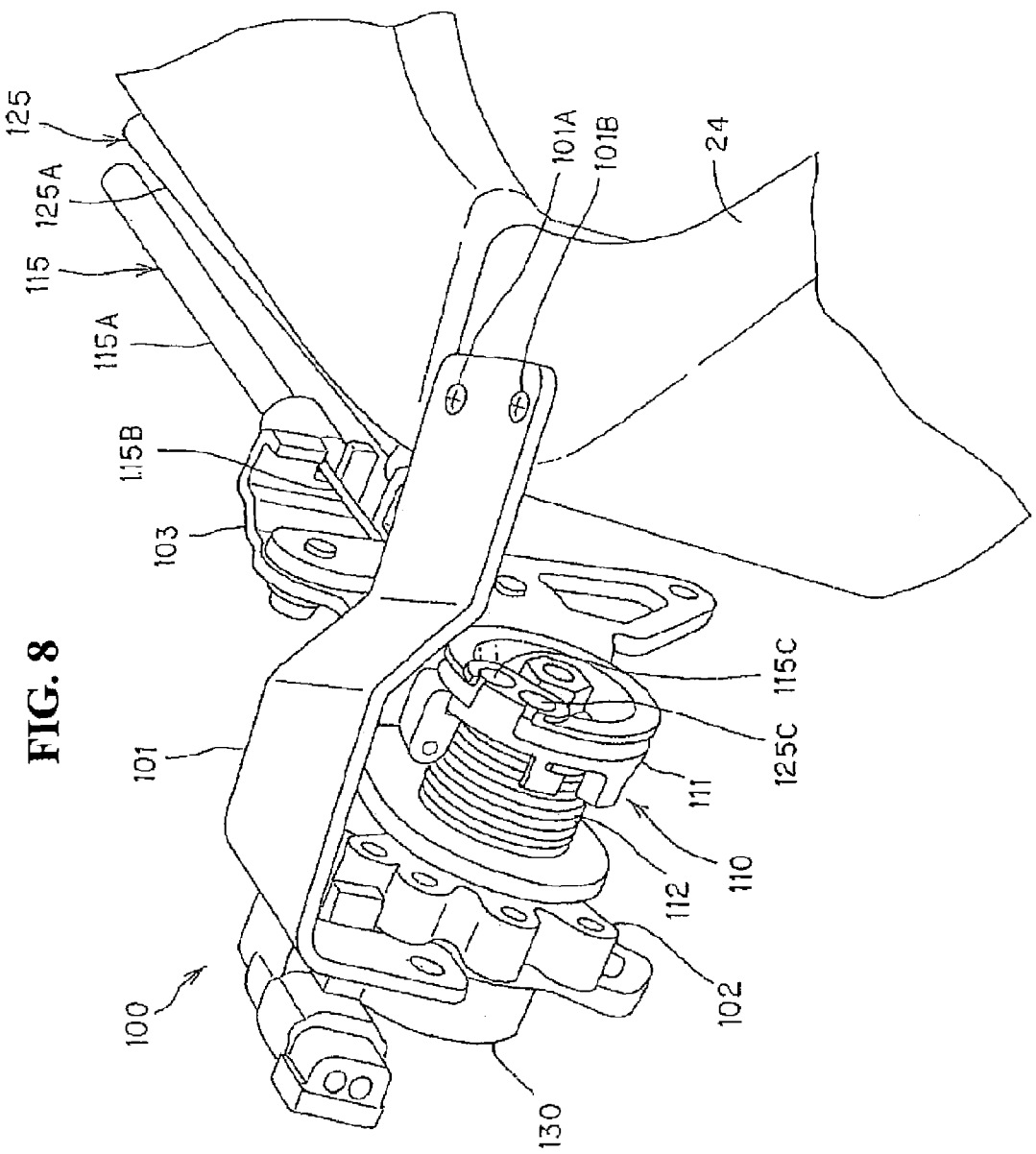
FIG. 8 is a perspective view illustrating the AP sensor along with the peripheral configuration thereof.

As shown in FIGS. 7 and 8, the AP sensor 100 has a sensor support plate 102 secured to the bracket 101 with the screws 101A and 101B. A throttle drum 110 is turnably mounted to the sensor support plate (sensor body) 102. Two throttle cables 115 and 125 pulled out from the throttle grip 15A are connected to the throttle drum 110. One throttle cable 115 functions as an opening-side throttle cable that is pulled in response to the opening-side turning of the throttle grip 15A. The other throttle cable 125 functions as a closing-side throttle cable that is pulled in response to the closing-side turning of the throttle grip 15A.

Figure 9:
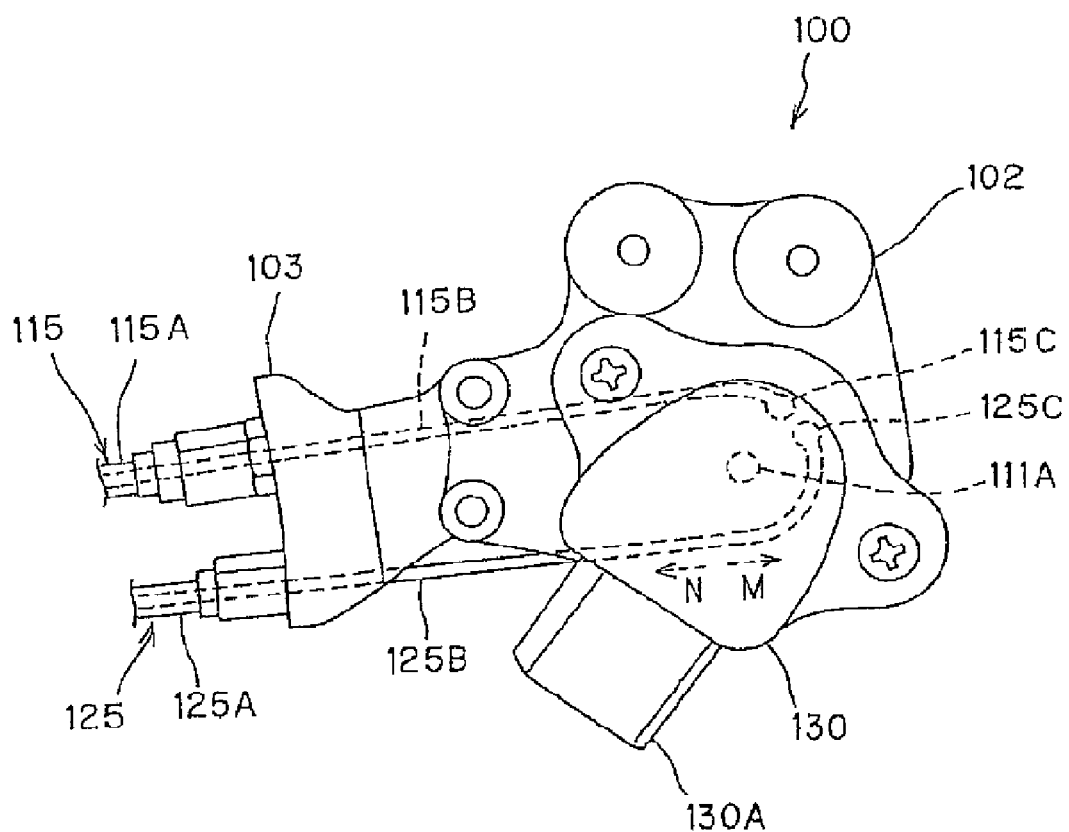
FIG. 9 is a lateral view of the AP sensor.

More specifically, the throttle cables 115 and 125 use respective push cables in which inner cables 115B and 125B are movably inserted into outer cables 115A and 125A, respectively, as shown in FIG. 9.

The throttle cables 115 and 125 extend from the throttle grip 15A toward the vicinity of the head pipe 12, and thereafter as shown in FIG. 8, extend along the external lateral surface of the vehicle body left side main frame 24. The respective ends of the outer cables 115A and 125A are fixedly supported by a cable support plate 103 formed at the front end of the sensor support plate 102.

As shown in FIG. 9, the inner cable 115B pulled out from the outer cable 115A of the opening-side throttle cable 115 is wound on the outer circumference of the throttle drum 110 while an engaging piece 115C provided at one end of the inner cable 115B is engaged with the throttle drum 110. The winding direction of the opening-side throttle cable 115 is set in a direction where the throttle drum is turnably driven in an opening direction M indicated with an arrow in FIG. 9 during a pull.

The inner cable 125B pulled out from the outer cable 125A of the closing-side throttle cable 125 is wound on the outer circumference of the throttle drum 110 while the engaging piece 125C provided at one end of the inner cable 125B is engaged with the throttle drum 110. The winding direction of the closing-side throttle cable 125 is set in a direction where the throttle drum 110 is turnably driven in a closing direction N indicated with an arrow in FIG. 9 during a pull.

The throttle drum 110 includes a turning disk 111 around which the throttle cables 115 and 125 are wound. The turning disk 111 is supported turnably around a shaft 111A and biased to turn in the closing direction N by a return spring 112, a torsion spring.

With such a configuration, when the throttle grip 15A is opened, the turning disk 111 is turned in the opening direction M against the biasing force of the return spring 112. When the throttle grip 115A is returned, the turning disk 111 is turned in the closing direction N by the biasing force of the return spring 112.

A throttle operation amount sensor 130 is connected to a surface (the surface on the external side of a vehicle body) of the sensor support plate 102 opposed to the throttle drum 110. The throttle operation amount sensor 130 detects a turning amount of the turning disk 111 of the throttle drum 110, thereby detecting an operation amount of the throttle grip 15A, namely, a rider's throttle operation amount.

A connector 130A of the throttle operation amount sensor 130 is connected to an electronic control unit (ECU) 200 for controlling the various parts of the motorcycle 10. The throttle operation amount detected by the throttle operation amount sensor 130 is notified to the electronic control unit 200.

Figure 10:
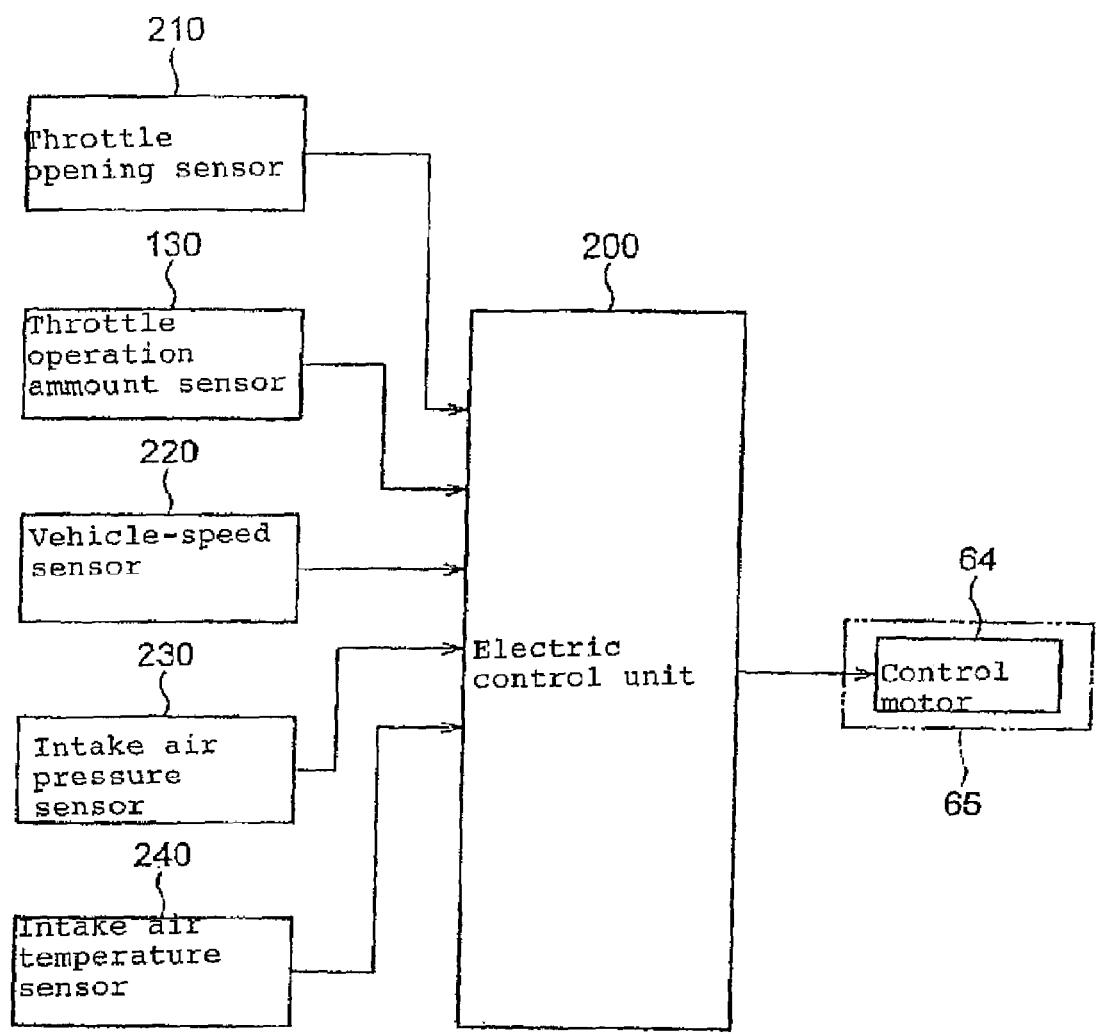
FIG. 10 is a block diagram illustrating a throttle control system.

FIG. 10 is a block diagram illustrating a throttle control system. The electronic control unit 200 is a device that centrally controls the various parts of the vehicle body. In the throttle control, the electronic control unit 200 drives the control motor 64 on the basis of a throttle operation amount detected by the throttle operation amount sensor 130 to drive the throttle valve 63B, thereby controlling throttle opening.

The electronic control unit 200 receives respective signals outputted from a throttle opening sensor 210 for detecting the opening degree of the throttle valve 63B, from a vehicle-speed sensor 220 for detecting vehicle-speed, from an intake air pressure sensor 230 for detecting pressure of intake air for the engine 17, and from an intake air temperature sensor 240 for detecting intake air temperature. On the basis of the detection results of such sensors, the electronic control unit 200 appropriately corrects and controls the throttle opening degree so that a rider may obtain acceleration or deceleration that meets her or his expectation by throttle operation.

As described above, the motorcycle 10 of the present embodiment has the AP sensor 100, which is disposed externally of and close to the vehicle body left side main frame 24. Therefore, it is not necessary to dispose the AP sensor between the main frames 24. This makes it easy to assemble or remove the AP sensor as compared with the AP sensor disposed between the main frames 24 according to the background art. In addition, the distance between the main frames 24 can be reduced to suppress an increase in vehicle-width. The distance between the main frames 24 can be reduced to provide effects that lowering of foot-grounding performance of an occupant mounting on the motorcycle 10 can be avoided and that the capacity of the radiator 67 disposed externally of the main frame 24 can sufficiently be ensured.

In the present configuration, the throttle cables 115 and 125 extending from the throttle grip 15A on the right side handlebar 15 are arranged to extend along the outside of the vehicle body left side main frame 24. Thus, the throttle cables 115 and 125 can be arranged to extend without an abrupt bend, while drawing a gentle arc. This extending arrangement provides approximately the same trajectory as in the configuration of the throttle manual-operation according to the background art, wherein the throttle cable extending from the throttle grip is directly connected to the throttle valve and also can make the throttle cable approximately the same extending length as that of the one according to the background art.

More specifically, in the configuration of the throttle manual-operation, the throttle cable extending from the throttle grip is extended to the vicinity of the head pipe 12, then passed below the main frames 24, and extended to the throttle body 63. However, the configuration of the present embodiment provides approximately the same extending arrangement as a case where the background art arrangement of the throttle cable extending from the vicinity of the head pipe 12 and passing below the main frames 24 is changed to approximately horizontal extending arrangement. Thus, it is possible to make the operating feeling of the throttle almost the same as the one according to the background art. Even if the AP sensor 100 is disposed, it is possible to suppress an increase in vehicle-width without changing the operating feeling of the throttle.

In the present configuration, the AP sensor 100 is disposed in the existing unused space defined between the transverse-mounted radiator 67 and the side upper cover 42B (FIG. 2) covering between the side cover 42 and the main frame 24. Therefore, it is not necessary to newly provide an arrangement space for the AP sensor 100 and it is possible to avoid adhesion of dust or the like. Also in this configuration, a maintenance operator (owner or the like) can easily access the AP sensor 100 by removing the side upper cover 42 or by removing an opening/closing lid provided above the AP sensor in the side upper cover 42B. This makes it possible to easily perform work such as grease injection, component replacement and the like.

Second Embodiment

Figure 11:
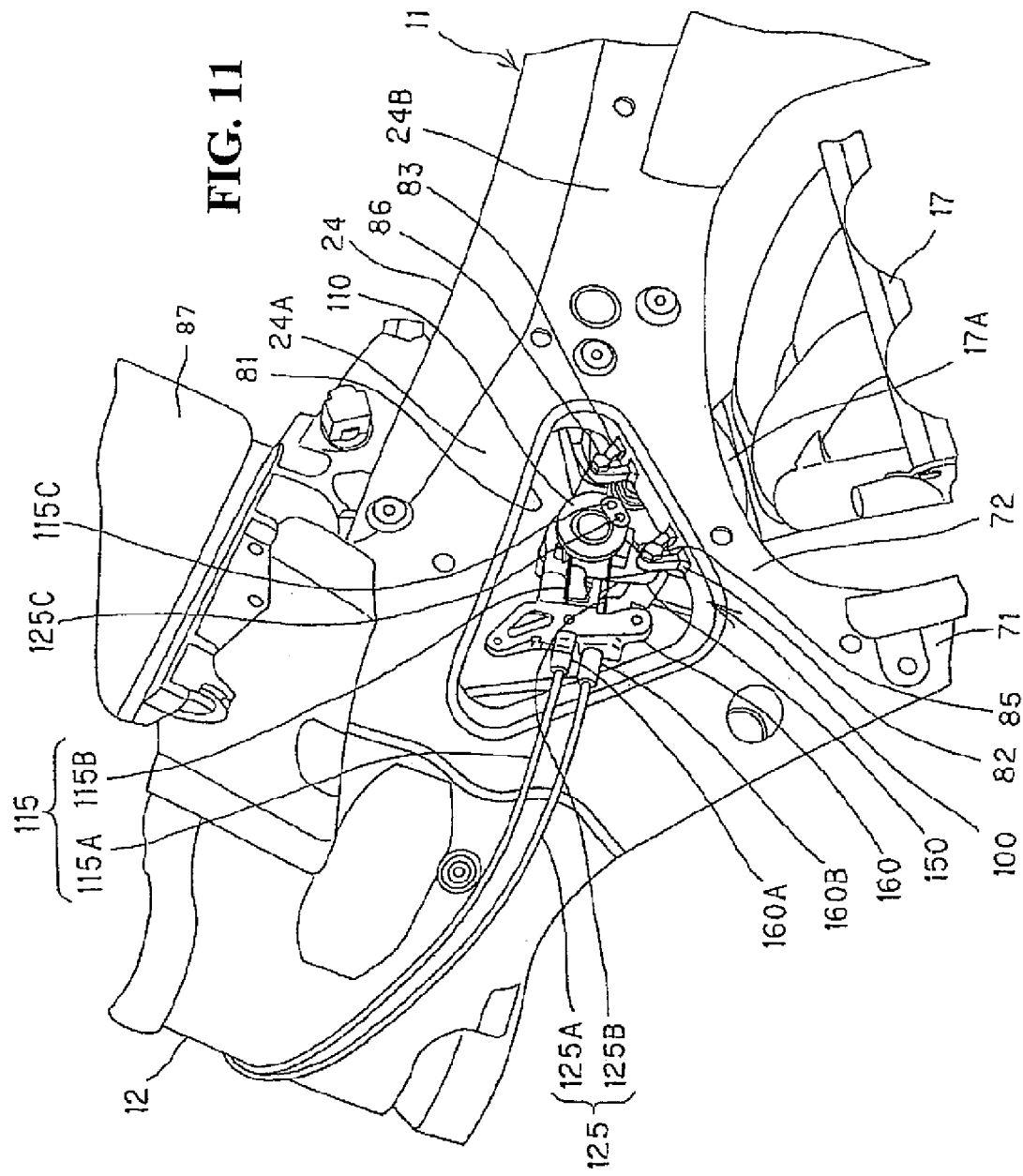
FIG. 11 illustrates an AP sensor according to a second embodiment as viewed from the side of a body frame.

FIG. 11 illustrates an AP sensor 100 according to a second embodiment of the present invention as viewed from the side of a body frame 11. In the present embodiment, configurations approximately identical to those in the first embodiment are identified with like reference numerals and their detailed explanations are omitted.

Referring to FIG. 11, a body frame 11 includes a pair of right and left main frames 24 that branch right and left from a head pipe 12 and extend rearward and obliquely downwardly. A pair of left and right down tubes 71 extend from the head pipe 12 downwardly of a vehicle body and support an engine 17. A pair of left and right connection members (tension pipes) 72 each connects a corresponding one of the rear portions of the main frames 24 with a corresponding associated one of the lower portions of the down tubes 71. The main frames 24, the down tubes 71 and the connection members 72 are integrally formed by casting. In FIG. 11, reference numeral 87 identifies an air cleaner disposed between the main frames 24.

The main frame 24 is provided such that a main frame front end portion 24A located forward of a join portion with the connection member 72 is formed thinner than a main frame intermediate portion 24B as viewed from the side. In addition, the upper surface of the main frame front end portion 24A slants rearward downward so as to smoothly merge with the upper surface of the main frame intermediate portion 24B so that the head pipe 12 is connected with the main frame intermediate portion 24B. The connection member 72 extends from the down tube 71 obliquely and rearward upwardly at a portion below the main frame front end portion 24A and connects with the main frame intermediate portion 24B. In this way, the main frame front end portion 24A, the connection member 72 and the down tube 71 are almost triangularly assembled to enhance the frame rigidity of the front portion of the body frame 11. In addition, a pair of left and right opening portions 81 is each formed almost triangularly on the side of the front portion of the body frame 11.

In this configuration, the AP sensor 100 for detecting the operation of a throttle grip 15A (FIG. 2) provided on the right side of the handlebar 15 is disposed in the opening portion 81 opening to the left side of the front portion of the body frame 11. More properly, upwardly projecting boss portions 82 and 83 are formed integrally with the connection member 72 so as to be spaced apart from each other in the back and forth direction. The AP sensor 100 is brought into contact with the inside of the boss portions 82 and 83 and secured to the boss portions 82 and 83 with bolts 85 and 86 inserted into the boss portions 82 and 83, respectively, from the outside (the vehicle body widthwise outside) thereof.

Figure 12:
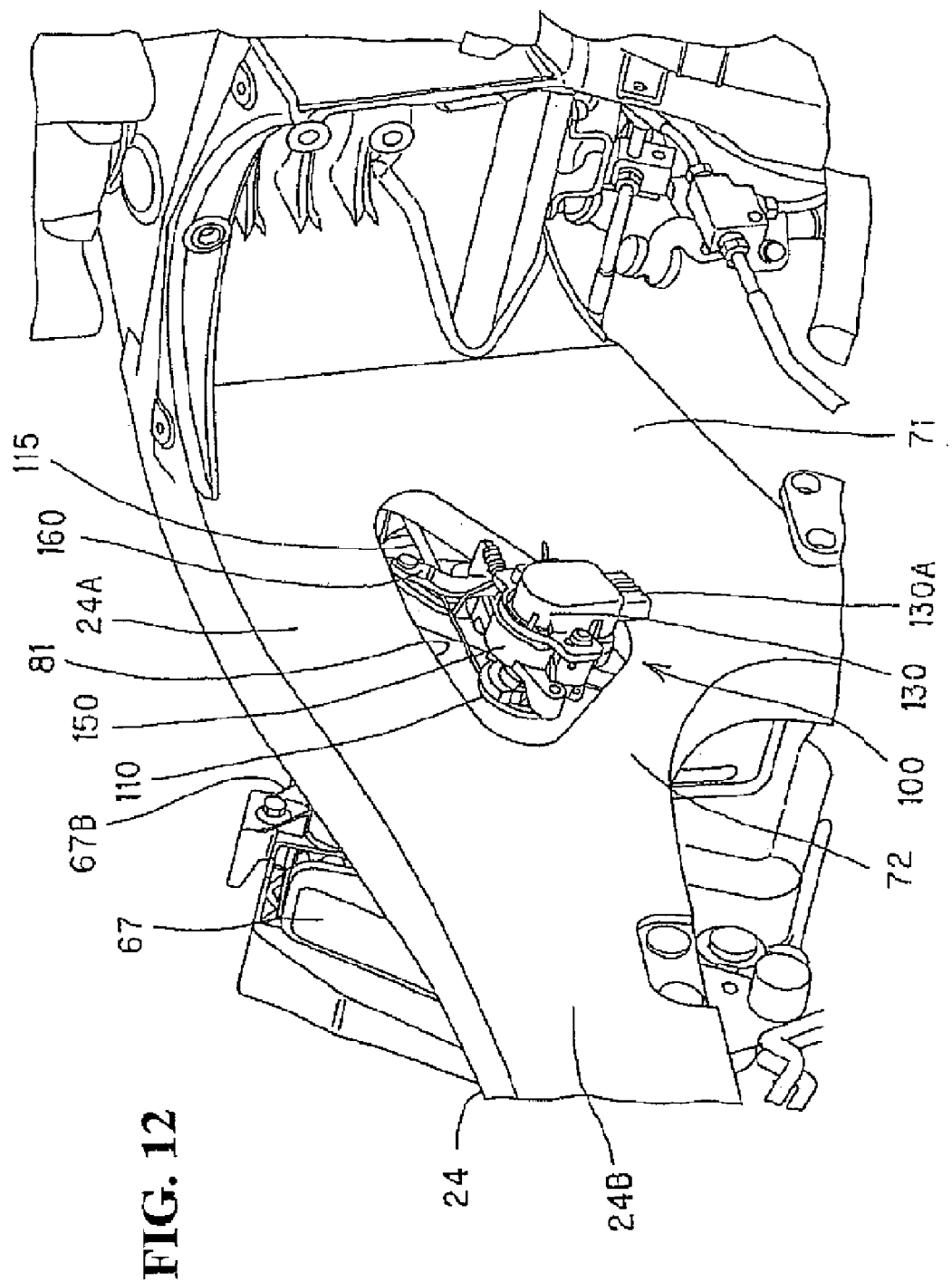
FIG. 12 illustrates the AP sensor as viewed from the rear side of the body frame.
Figure 13:
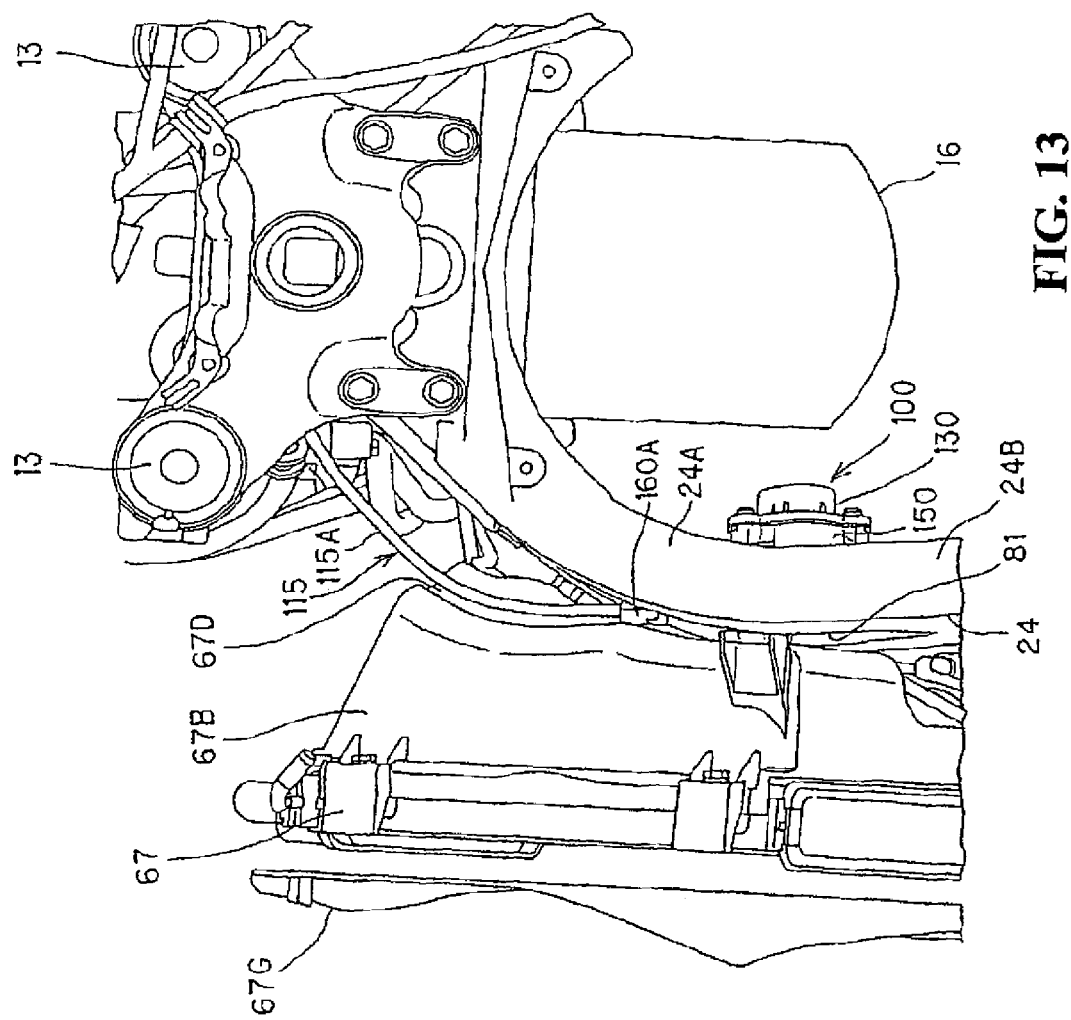
FIG. 13 illustrates the AP sensor as viewed from above the body frame.
Figure 14:
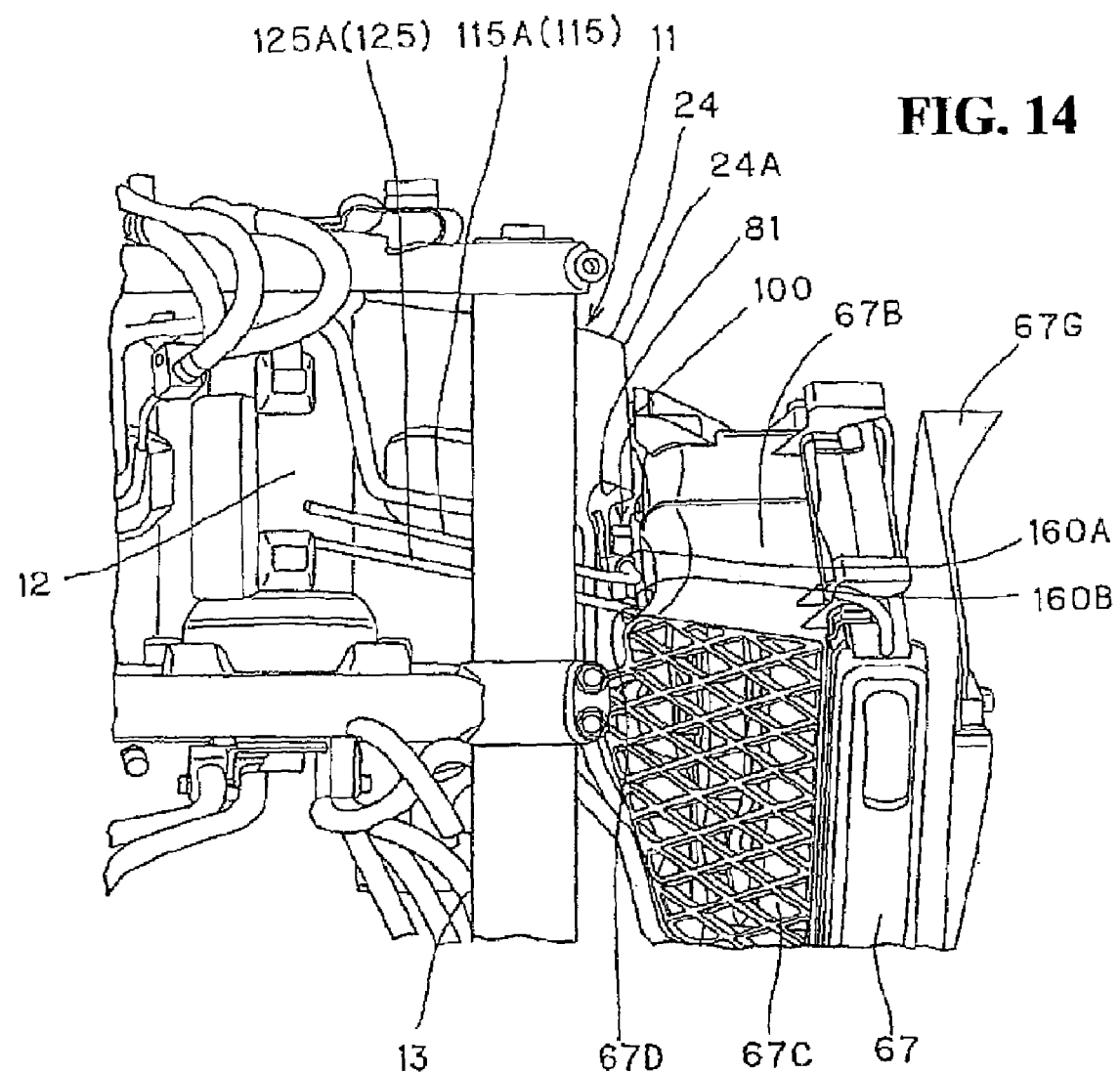
FIG. 14 illustrates the AP sensor as viewed from the front side of a vehicle body.
Figure 15:
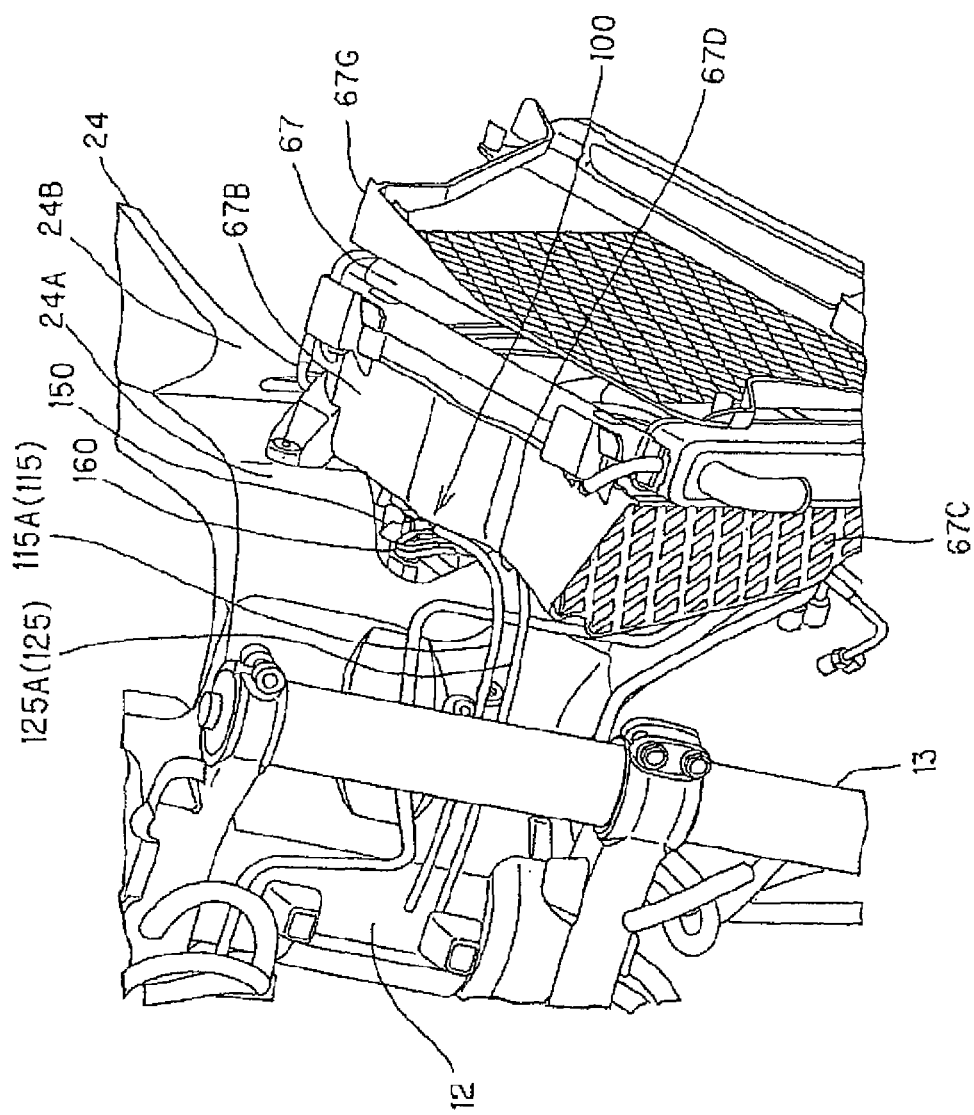
FIG. 15 illustrates the AP sensor as viewed from obliquely above.

FIG. 12 illustrates the AP sensor 100 as viewed from the rear side of the body frame 11. FIG. 13 illustrates the AP sensor 100 as viewed from above the body frame 11. FIG. 14 illustrates the AP sensor 100 as viewed from the front side of the vehicle body. FIG. 15 illustrates the AP sensor 100 as viewed from obliquely above. As shown in FIGS. 12 and 13, the almost entire AP sensor 100 is accommodated in the opening portion 81 except for a connector 130A.

More specifically, as shown in FIGS. 11 and 12, the AP sensor 100 includes a sensor body 150 joined to the boss portions 82 and 83; and a cable support plate portion 160 holding respective outer cables 115A and 125A of the two throttle cables 115 and 125 pulled out from the throttle grip 15A. Since the cable support plate portion 160 is located on the front side of the sensor body 150, the AP sensor 100 is formed so that it can approximately be accommodated in the width of the main frame 24 and the back-and-forth length of the AP sensor 100 can be accommodated in the back-and-forth length of the opening portion 81.

The cable support plate portion 160 includes cable joint portions 160A and 160B (FIG. 11) that are vertically spaced apart from each other and extend toward the front of the vehicle body. As shown in FIG. 13, since the main frame 24 bends toward the head pipe 12 as viewed from above in the vicinity of the cable joint portions 160A and 160B, the throttle cables 115 and 125 (outer cables 115A and 125A) can be arranged to extend from the head pipe 12 along the left main frame 24 without occurrence of an abrupt bend and almost without contact with the main frame 24.

As shown in FIG. 11, a throttle drum 110 with which the throttle cables 115 and 125 are connected is turnably supported by the sensor body 150 outwardly of the vehicle body. More specifically, the inner cable 115B of the throttle cable 115 which is an opening-side throttle cable is wound from above around the throttle drum 110 and an engaging piece 115C provided at one end of the inner cable 115B is engaged with the throttle drum 110. In addition, the inner cable 125B of the throttle cable 125 which is a closing-side throttle cable is wound from below around the throttle drum 110 and an engaging piece 125C provided at one end of the inner cable 125B is engaged with the throttle drum 110. The throttle drum 110 is turnably biased to the closing side (clockwise in FIG. 11) of the throttle grip 15A by a return spring 112 (not shown).

With such a configuration, if the throttle grip 15A is opened, the throttle drum 110 is turned to the opening side (counterclockwise in FIG. 11) against the biasing force of the return spring 112. If the throttle grip 15A is returned, the throttle drum 110 is turned to the closing side against the biasing force of the return spring 112.

As shown in FIG. 12, a throttle operation amount sensor 130 for detecting the turning amount of the throttle drum 110 is provided on the sensor body 150 inwardly of the vehicle body.

As shown in FIGS. 12 and 13, the connector 130A of the throttle operation amount sensor 130 projects from the opening portion 81 inwardly of the vehicle body toward downward of the vehicle body. A cable arranged to extend from an electronic control unit (ECU) 200 (not shown) for controlling various portions of the motorcycle 10 is connected from below to the connector 130A. The throttle operation amount detected by the throttle operation amount sensor 130 is notified to the electronic control unit 200, which drives a motor to control the throttle opening.

Figure 16:
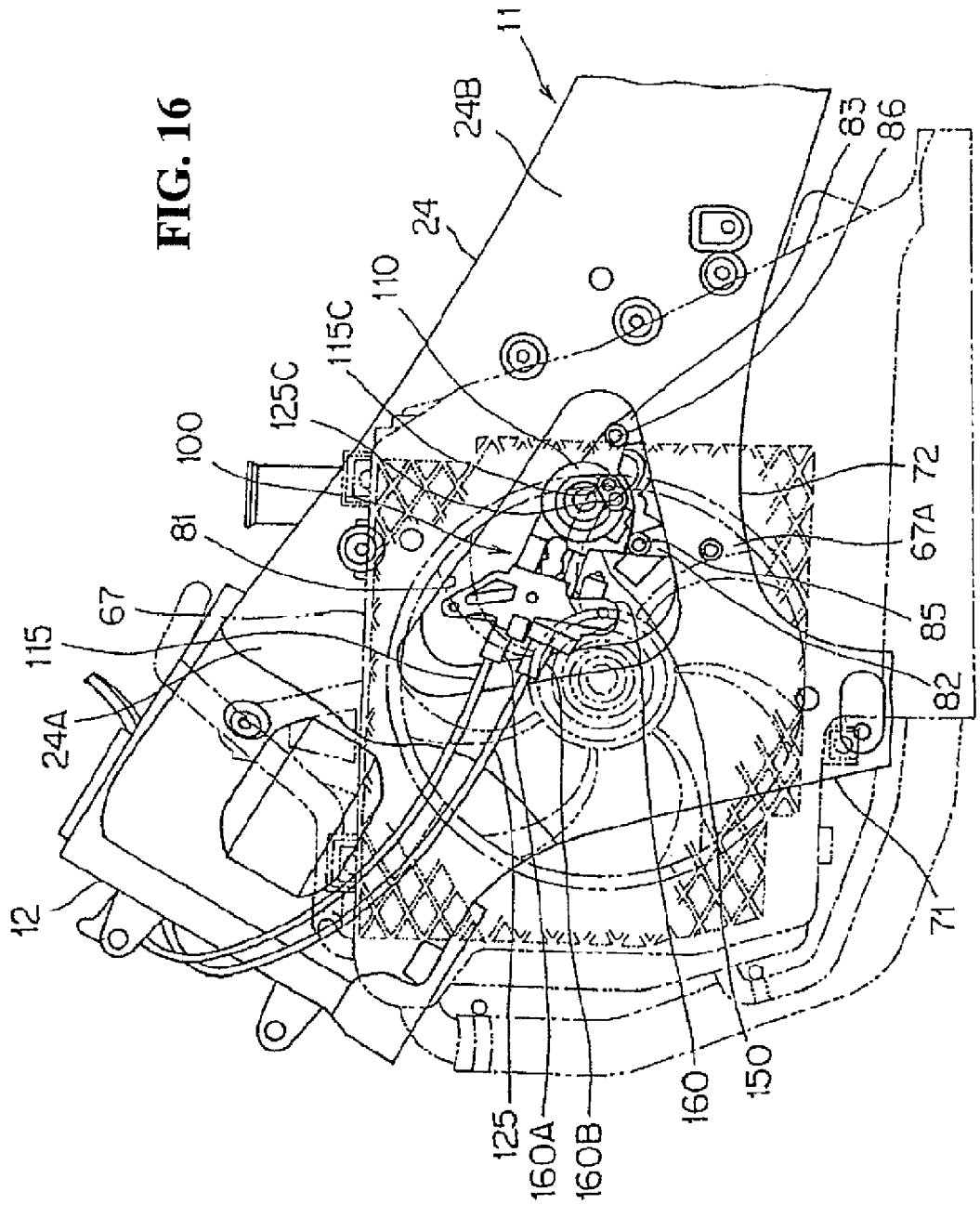
FIG. 16 is a lateral view illustrating the AP sensor together with peripheral configurations.

In the present embodiment, a transverse-mounted radiator 67 is disposed outwardly of the front end portion of the main frame 24 as shown in FIG. 13. In this arrangement layout, the transverse-mounted radiator 67 is disposed at a position overlapping, as viewed from the side, the AP sensor disposed in the opening portion 81 in the front portion of the body frame 11 as shown in FIG. 16. Thus, the AP sensor 100 cannot be seen from the outside because of the radiator 67, that is, the AP sensor 100 can inconspicuously be arranged in terms of external appearance.

A radiator cover 67B is disposed inwardly of the radiator 67 with respect to the vehicle body. A radiator grill 67G is disposed outwardly of the radiator 67 with respect to the vehicle body. The radiator cover 67B functions as a cooling air introducing box. In addition, the radiator cover 67B is concave toward the inside of the vehicle body and close to the main frame 24 and is formed, by integral molding, with an opening portion 67C (FIGS. 14 and 15) provided with a lattice-like grill on the front side of the cover. This makes it possible to introduce the running air from the front of the vehicle body, into the inside of the cover 67B from the opening portion 67C thus the running air passes through the radiator 67. If a radiator fan 67A (FIG. 5) of the radiator 67 is rotated during parking or the like, air passing through the radiator 67 is blown toward the front of the vehicle body via the opening portion 67C.

A wall of the radiator cover 67B inward of the vehicle body is formed with a concave portion 67D concave along the throttle cables 115 and 125. This concave portion 67D avoids the interference between the radiator cover 67B and the throttle cables 115 and 125.

As described above, in the motorcycle 10 of the present embodiment, the AP sensor 100 is disposed in the opening portion 81 surrounded by the main frame 24, the down tube 71 and the connection member 72 and opening to the side of the vehicle body. Thus, the distance between the main frames 24 can be reduced compared with that of a background art motorcycle in which the AP sensor is disposed between the main frames. This can suppress an increase in vehicle-width. In addition, a situation can be avoided where the AP sensor 100 limits the arrangement of the transverse-mounted radiator 67 located outwardly of the main frames 24.

The throttle cables 115 and 125 extending from the throttle grip 15A on the right side of the handlebar 15 are arranged to extend along the outside of the vehicle body left side main frame 24 and connected with the AP sensor 100. Thus, the throttle cables 115 and 125 can be arranged to extend without an abrupt bend, while drawing a gentle arc. This extending arrangement can be made approximately the same as in the configuration of the background art throttle manual-operation in which the throttle cable extending from the throttle grip is directly connected to the throttle valve and can make the operating feeling of the throttle almost the same as the one according to the background art. In short, even if the AP sensor 100 is disposed, it is possible to suppress an increase in vehicle-width without changing the operating feeling of the throttle.

In the configuration, since the AP sensor 100 is disposed in the existing opening portion 81 that is formed as a result of increasing the rigidity of the body frame 11, it is not necessary to newly provide an arrangement space for the AP sensor 100. Thus, the existing unused space can effectively be used to increase space use efficiency.

Since the transverse-mounted radiator 67 disposed on the outside of the main frame 24 is disposed at a position overlapping the AP sensor 100 as viewed from the side, the AP sensor 100 can inconspicuously be disposed in terms of external appearance.

Since the main frames 24, the down tubes 71 and the connection members 72 are integrally formed by casting, compared with the case where they are manufactured separately from each other, a bonding operation is eliminated and variations in the shapes of the opening portions 81 are reduced. This can avoid situations or the like where the opening portion 81 is machined for correction when the AR sensor 100 is disposed in the opening portion 81.

Since it is only needed to mount the AP sensor 100 from the outside of the vehicle body with the two bolts 85 and 86, the AP sensor 100 can be mounted and dismounted with ease.

The presence invention has been described based on the embodiment thus far but is not limited to this embodiment. Various design changes can be performed. For example, the embodiment describes the case where the present invention is applied to the accelerator position sensor arrangement structure for the motorcycle as described above. However, the invention is not limited to this but can widely be applied to the accelerator position sensor arrangement structure for optional motorcycles such as scooter type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An accelerator position sensor arrangement structure for a motorcycle, comprising:
    an accelerator position sensor adapted to detect operation of a throttle grip provided on a right side of a handlebar; and
    a control motor adapted to drive a throttle valve which controls an amount of intake air for an engine supported by a body frame,
    wherein the accelerator position sensor is connected to the throttle grip via a throttle cable, and is disposed externally of main frames, of the body frame, extending from a head pipe toward a rear of a vehicle body,
    wherein the main frames are right and left side main frames which branch right and left from the head pipe and extend toward the rear of the vehicle body,
    the accelerator position sensor is disposed externally of the left side main frame and is secured to an upper surface of the left side main frame via a bracket having a laterally extending portion which extends outwardly from the left side main frame, and a downwardly extending portion at an outer end of the laterally extending portion,
    wherein the accelerator position sensor includes a throttle drum disposed under the laterally extending portion of the bracket and a throttle operation amount sensor disposed on an outer side of the downwardly extending portion of the bracket for detecting a turning amount of the throttle drum, and wherein the throttle cable extending from the throttle grip is arranged to extend from a vicinity of the head pipe along an external lateral surface of the vehicle body left side main frame, and is connected to the throttle drum of the accelerator position sensor.

2. The accelerator position sensor arrangement structure for the motorcycle according to claim 1,
    and further comprising a radiator disposed externally of the main frames in a position under the accelerator position sensor,
    the radiator having a fan which blows in a lateral direction with respect to the vehicle body.

3. The accelerator position sensor arrangement structure for the motorcycle according to claim 1, wherein the control motor and the throttle valve are disposed between the right and left side main frames, the control motor being positioned adjacent to the right side main frame.

4. The accelerator position sensor arrangement structure for the motorcycle according to claim 1,
    and further comprising a radiator disposed externally of the main frames in a position under the accelerator position sensor,
    the radiator having a fan which blows in a lateral direction with respect to the vehicle body.

5. The accelerator position sensor arrangement structure for the motorcycle according to claim 1, and further comprising a radiator disposed externally of the left side main frame, and a side cover covering a vehicle body lateral portion including the radiator,
    the side cover has an appearance cover covering the radiator from above so as to be exposed to the outside, and
    the accelerator position sensor is disposed between the appearance cover and the radiator.

6. The accelerator position sensor arrangement structure for the motorcycle according to claim 4, wherein the accelerator position sensor is disposed above the radiator and the bracket is secured to the upper surface of the left side main frame with screws.

7. The accelerator position sensor arrangement structure for the motorcycle according to claim 5, wherein the appearance cover is adapted to be opened, thereby providing access the accelerator position sensor from above.

8. The accelerator position sensor arrangement structure for the motorcycle according to claim 4, wherein the body frame includes left and right down tubes, and
when seen in a side view, the radiator overlaps portions of the head pipe, the left down tube, and the left side main frame.

9. The accelerator position sensor arrangement structure for the motorcycle according to claim 4, wherein the body frame includes left and right down tubes, and
when seen in a side view, the radiator overlaps portions of the head pipe, the left down tube, and the left side main frame, and extends in a longitudinal direction of the vehicle body by amounts that are further forward and further rearward than any parts of the accelerator position sensor.

10. The accelerator position sensor arrangement structure for the motorcycle according to claim 1, wherein the throttle grip is provided on a right side of a handlebar, and
the throttle cable extending from the throttle grip is arranged in an arc shape extending along a forward side of the head pipe and along an external lateral surface of the vehicle body left side main frame, and is connected to a throttle drum of the accelerator position sensor.

11. The accelerator position sensor arrangement structure for the motorcycle according to claim 1, wherein the throttle grip is provided on a right side of a handlebar, and
the throttle cable extending from the throttle grip is arranged in an arc shape extending toward a left side of the vehicle body, through a space that is forward with respect to the head pipe and rearward with respect to a front fork, and then along an external lateral surface of the vehicle body left side main frame, and is connected to a throttle drum of the accelerator position sensor.

12. The accelerator position sensor arrangement structure for the motorcycle according to claim 1,
wherein the throttle operation amount sensor is connected to a surface of a sensor support plate opposed to the throttle drum.

13. The accelerator position sensor arrangement structure for the motorcycle according to claim 1, wherein throttle cable includes two throttle cables, outer ends of which are fixedly supported by a cable support plate provided on a forward side of the bracket.

14. The accelerator position sensor arrangement structure for the motorcycle according to claim 1, wherein the engine is a horizontally-opposed 6-cylinder engine in which three cylinders lined in a back and forth direction of the vehicle body are provided on each of left and right sides of the vehicle body.

15. The accelerator position sensor arrangement structure for the motorcycle according to claim 14, wherein the throttle valve opens in a vertical direction, and is disposed midway between the three cylinders on the left side and three cylinders on the right side.

16. An accelerator position sensor arrangement structure for a motorcycle, comprising:
an accelerator position sensor adapted to detect operation of a throttle grip; and
a control motor adapted to drive a throttle valve which controls an amount of intake air for an engine suspended below a pair of main frames,
a radiator disposed externally of the main frames and having a fan which blows in a lateral direction with respect to the vehicle body,
wherein the accelerator position sensor is connected to the throttle grip via a throttle cable, and is disposed externally of main frames extending from a head pipe toward a rear of a vehicle body,
wherein the main frames are right and left side main frames which branch right and left from the head pipe and extend toward the rear of the vehicle body,
the accelerator position sensor is disposed externally of the left side main frame and is secured to an upper surface of the left side main frame via a bracket which extends outwardly from the left side main frame, and
the radiator is disposed in a position under the accelerator position sensor, in a position that is higher than all portions of the engine, and forward with respect to the control motor and the throttle valve,
wherein the radiator includes a radiator cover disposed inwardly of the radiator with respect to the vehicle body, and
the radiator cover is formed with a concave portion which ensures that the radiator cover does not interfere with a portion of the throttle cable extending along the external lateral surface of the left main frame to the accelerator position sensor.

17. The accelerator position sensor arrangement structure for the motorcycle according to claim 16, wherein the engine is a horizontally-opposed 6-cylinder engine in which three cylinders lined in a back and forth direction of the vehicle body are provided on each of left and right sides of the vehicle body.

18. The accelerator position sensor arrangement structure for the motorcycle according to claim 17, wherein the throttle valve opens in a vertical direction, and is disposed midway between the three cylinders on the left side and three cylinders on the right side.

19. An accelerator position sensor arrangement structure for a motorcycle, comprising:
an accelerator position sensor adapted to detect operation of a throttle grip; and
a control motor adapted to drive a throttle valve which controls an amount of intake air for an engine supported by a body frame,
wherein the accelerator position sensor is connected to the throttle grip via a throttle cable, and is disposed externally of main frames, of the body frame, extending from a head pipe toward a rear of a vehicle body,
wherein the main frames are right and left side main frames which branch right and left from the head pipe and extend toward the rear of the vehicle body,
the accelerator position sensor is disposed externally of the left side main frame and is secured to an upper surface of the left side main frame via a bracket which extends outwardly from the left side main frame,
and further comprising a radiator disposed externally of the left side main frame, and a side cover covering a vehicle body lateral portion including the radiator, the radiator having a fan which blows in a lateral direction with respect to the vehicle body,
wherein the side cover has an appearance cover covering the radiator from above so as to be exposed to the outside, and the accelerator position sensor is disposed between the appearance cover and the radiator,
wherein the radiator includes a radiator cover disposed inwardly of the radiator with respect to the vehicle body, and
the radiator cover is formed with a concave portion which ensures that the radiator cover does not interfere with a portion of the throttle cable extending along the external lateral surface of the left main frame to the accelerator position sensor.

20. The accelerator position sensor arrangement structure for the motorcycle according to claim 19, wherein the control motor and the throttle valve are disposed between the right and left side main frames, the control motor being positioned adjacent to the right side main frame.

\* \* \* \* \*